(12) United States Patent
Nilsson

(10) Patent No.: US 6,814,523 B1
(45) Date of Patent: Nov. 9, 2004

(54) CONNECTING DEVICE

(75) Inventor: Ivar Nilsson, Enebyberg (SE)

(73) Assignee: VSL International AG, Bern (CH)

( * ) Notice: Subject to any disclaimer, the term of this patent is extended or adjusted under 35 U.S.C. 154(b) by 15 days.

(21) Appl. No.: 10/089,746

(22) PCT Filed: Oct. 5, 2000

(86) PCT No.: PCT/SE00/01927

§ 371 (c)(1),
(2), (4) Date: Jul. 23, 2002

(87) PCT Pub. No.: WO01/25651

PCT Pub. Date: Apr. 12, 2002

(30) Foreign Application Priority Data

Oct. 5, 1999 (SE) .............................................. 9903585

(51) Int. Cl.[7] .............................................. F16G 11/00
(52) U.S. Cl. .................... 403/305; 403/302; 403/306; 403/307; 403/308; 403/311; 403/312; 14/22; 52/223.13
(58) Field of Search ................................ 403/286, 292, 403/294, 296, 300–303, 305–308, 311, 312, 315–317, 319, 320; 52/223.13, 726.1, 740.1; 24/135 A, 135 R; 14/22, 23, 31; 254/134.3 FT, 233–236

(56) References Cited

U.S. PATENT DOCUMENTS

| 2,339,488 | A | * | 1/1944 | Kratoville | ................... | 403/305 |
| 3,387,417 | A | * | 6/1968 | Howlett | ..................... | 52/223.13 |
| 4,438,612 | A | * | 3/1984 | Bernard et al. | ................ | 52/427 |
| 4,733,442 | A | * | 3/1988 | Asai | .......................... | 24/580.1 |
| 5,938,180 | A | * | 8/1999 | Walsten | .............. | 254/134.3 FT |

FOREIGN PATENT DOCUMENTS

| EP | 0 228 165 A2 | 7/1987 |
| GB | 960 436 | 6/1964 |
| GB | 1 193 906 | 6/1970 |
| NO | 158402 | 5/1988 |

* cited by examiner

Primary Examiner—John R. Cottingham
Assistant Examiner—Michael P. Ferguson
(74) Attorney, Agent, or Firm—Hahn Loeser & Parks, LLP

(57) ABSTRACT

Connecting element for joining two support members (2, 3) absorbing tensile forces, which connecting element (1) comprises at least a first and a second casing body (5, 6) with a through-hole (7) for receiving the respective support members (2, 3), which casing bodies (5, 6) can be joined together by way of a joining section (9) at a first end (11) of each casing body (5, 6), the opposing second end (13) of each casing body (5, 6) being provided with locking members (15, 16) for holding the support members (2, 3) fast. In a working position the locking member (15, 16) of at least one casing body (5, 6) produces an axial locking of the support member (2, 3) running through the casing body (5, 6) by way of a stop part (20) created on the support member (2, 3) within the area of the second end (13) of the casing body (5, 6).

11 Claims, 4 Drawing Sheets

CONNECTING DEVICE

The present invention relates to a connecting element for joining two support members absorbing tensile forces, which connecting element comprises at least a first and a second casing body with a through-hole for receiving the respective support members, which casing bodies can be joined together by way of a joining section at a first end of each casing body, the opposing second end of each casing body being provided with locking members for holding the support members fast.

BACKGROUND OF THE ART

The invention has applications in the construction industry but is not confined to this. Connecting elements, or so-called wire locks, are used for joining support members, such as wire cores in bracing wires, together. Joining can be done during the actual process of assembling a cable consisting of a number of such bracing wires, where tightening of each bracing wire is done separately.

When the wire is tensioned with the required force, the wire can be permanently locked by means of a wedge arrangement against a foundation on a structural part that is to be braced. The connecting element can then be removed from the tensioned wire and fixed to a new wire for drawing.

Cables are used primarily for anchoring various structural parts to one another, such as structural parts in bridges, masts, buildings etc. These cables may be used on the one hand for staying once the structural parts are assembled, and on the other during actual building of the structure. Cables comprising such support members, such as wires, may be used in bridge structures such as suspension bridges, cable-stayed bridges etc.

Known wire locks generally suffer from the disadvantage that they are awkward to handle and take a long time to assemble and dismantle, which results in high costs. They also have a tendency to come unscrewed and/or to nip the wire core, which makes dismantling of the casing body more difficult. Nipping of the various parts in known wire locks furthermore means that they sit so tight fast after drawing of the wire that the devices must be scrapped, which results in high costs and unnecessarily high material consumption.

Known systems suffer therefore from lack of flexibility, primarily when dismantling, since these design constructions often nip the wire. In some embodiments, the designs according to the prior art have wedges, which cause the problem described above. Wedges are commonly encountered in prestressed concrete fittings. The wedges in the design according to the prior art also have the capacity to go askew in the casing part through which the wire runs, which further complicates handling and makes this unnecessarily expensive.

Nor can the wire be rotatably connected to the design construction according to the prior art. This means that unnecessary torque acts on the connecting element, with the risk of the latter coming unscrewed.

The object of the invention is to produce a connecting element, which produces axial locking of the support member, whilst the latter is free to rotate in the connecting element.

Another object of the invention is to produce a connecting element, which can be locked in its working position, that is to say in the position in which drawing of a bracing wire may take place, for example.

The connecting element must also have as few projecting parts as possible so that, for example, a wire cannot catch in these during the actual construction work.

The connecting element must furthermore offer good flexibility, permit controlled assembly and dismantling and provide safe use for construction personnel when, for example, fitting and detaching a draw wire from a bracing wire, such as are commonly used, for example, in the construction of a bridge, structure, etc. The draw wire may be a wire of the same material and dimension as the wire core of the bracing wire that is to be drawn, but may also be of some other material and with another dimension. The draw wire may thus be used in a recurrent operation when drawing a number of bracing wires.

SUMMARY OF THE INVENTION

This is achieved by a connecting element of the aforementioned type, in which in a working position the locking member of at least one casing body produces an axial locking of the support member running through the casing body by way of a stop part created on the support member within the area of the second end of the casing body.

Further solutions to the object of the invention and characteristics of the invention are specified in the other claims.

The invention means that the risk of fracture markings on the wire core is reduced, since the connecting element according to the invention permits rotation of the wire.

The invention means that a connecting element has been produced that can be quickly and easily locked in the working position and prevents this coming unscrewed, which is undesirable.

Such a connecting element also reduces the number of parts significantly compared to the prior art, which provides greater operating reliability. Because the wire core or the connecting element is free to rotate, undesirable stresses in the wire or torsional forces acting on the draw wire or the bracing wire are avoided. Nor do any torsional forces occur that might cause the connecting element to come unscrewed.

The object is furthermore to produce a connecting element that can be rapidly fitted to and detached from a bracing wire during the construction of a structure, in order to thereby save construction costs.

This is achieved by a method of fitting support members to a building construction by means of the connecting element of aforementioned type, which method involves passing the draw wire through a cable duct together with the connecting element so that the connecting element ends up in an area of a first foundation, connecting a bracing wire to the connecting element coupled to the draw wire, passing the bracing wire through the cable duct in the opposite direction by means of the draw wire and the assembled connecting element so that the connecting element ends up in an area of a second foundation, fixing the bracing wire to the first or second foundation respectively, and detaching the connecting element from the bracing wire.

Such a method provides a quick and simple way of applying a support member, such as a bracing wire, to a construction, such as a cable-stayed bridge.

BRIEF DESCRIPTION OF THE DRAWINGS

The invention will be described in more detail in the form of examples of embodiments with reference to figures attached, in which.

DETAILED DESCRIPTION OF A PREFERRED EMBODIMENT

Figure 1:
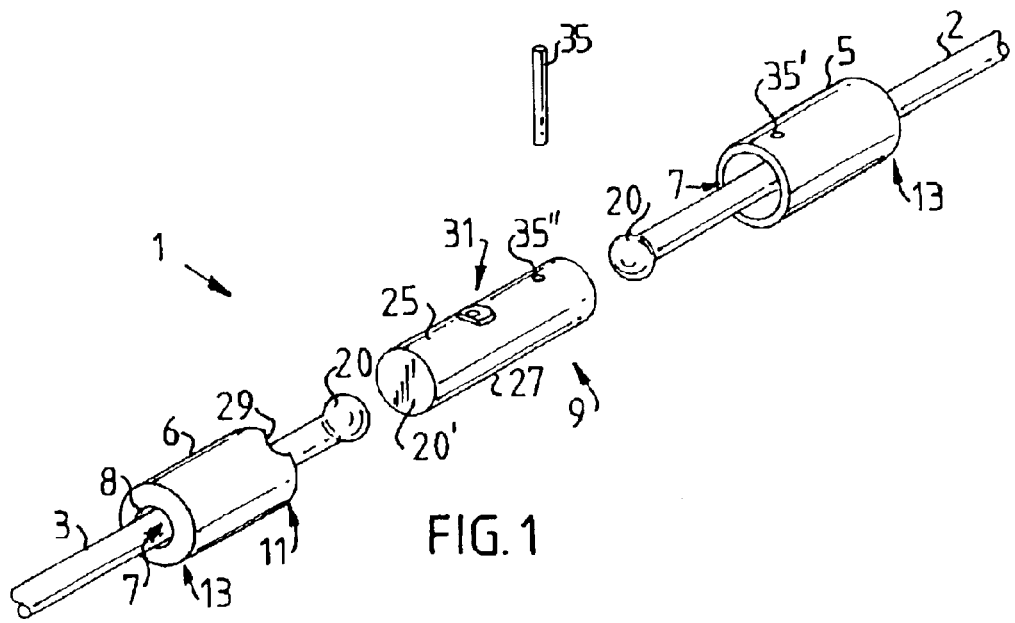
FIG. 1 shows a diagrammatic perspective view of a connecting element according to a first embodiment of the invention.

The term "working position" is taken to mean the condition in which the joint casing is fitted and locked between two wire ends. FIG. 1 shows a connecting element 1 according to a first embodiment of the invention in a dismantled condition. The connecting element 1 in FIG. 1 is intended to connect a draw wire 2 to a bracing wire 3. The connecting element 1 comprises a first and a second casing body 5 and 6, of which the first casing body 5 is intended to be coupled to the draw wire 2, which during construction is intended to draw a number of bracing wires 3 one at a time into a cable duct (not shown in FIG. 1, shown as 56 in FIG. 9). When the draw wire 2 has been passed through the first casing body 5 the end of the draw wire is upset to form a boss 20. The boss 20 can thus be made of the same material as the bracing wire 3. This has the advantage that there does not need to be any further material on the construction site in order to produce the boss 20. Upsetting is advantageously performed with a rounded shape. A stop part can thereby be produced by simple means.

A joint sleeve 27 provided with thread 25 (only partially shown in FIG. 1) is then screwed on to a first end 11 of the casing body 6 so that the boss 20 bears against a shoulder 26 (see FIG. 3) situated inside the casing body and so that a locking pin 35 can be hammered down through a bore 35' and corresponding hole 35" in the joint sleeve 27. The casing body 5, which is intended for a more permanent fixing, that is to say the casing body 5 that holds the draw wire 2 etc., can thereby be provided, for example, with a more permanent fixing arrangement of the casing body 5 to the joint sleeve 27. In this way the draw wire 2 is locked to the connecting element 1 by simple means. This results in reliable handling and easy assembly and dismantling.

The casing bodies 5 and 6 are provided with a through-hole 7 to receive the draw wire 2 and the bracing wire 3. The said hole 7 extends in the longitudinal direction of the connecting element 1. By incorporating a bore 8, which has a smaller diameter than the diameter of the boss 20, in a second end 13 of each casing body 5 and 6, the boss 20 can rest against a shoulder 26 situated inside the casing body (see FIG. 3). Thus in the working position the boss 20 of the bracing wire 3 bears, freely rotatable, against the shoulder 26 on the casing body 6, producing an axial locking of the bracing wire. The shoulder 26 is formed so that the inside diameter of the casing body 6 can accommodate the boss 20.

The arrangement described also applies to the coupling of the draw wire 2 to the casing body 5.

The casing body 6 of the connecting element 1 is also arranged at the corresponding end of the joint sleeve 27 for connection by means of a thread 25 on the joint sleeve 27 (the thread 25 is only partially shown). A corresponding thread 25' is produced in the casing body 6 (see FIG. 2). Two casing bodies 5 and 6 can thereby be connected to one another, of which one casing body 5 is coupled to the draw wire 2 and the other casing body 6 holds a bracing wire 3 that is to be drawn. One end 20' of the joint sleeve 27 preferably bears against the boss 20 when the joint sleeve 27 is connected to the casing body 6, which means that the boss 20 ends up in a position against the first shoulder 26 before drawing of the bracing wire 3.

When fitting the casing body 6 that holds the bracing wire 3, a recess 29 ends up against the head 33 of a lock bolt 31. This locking arrangement and the method of locking this will be further described below.

Figure 2:
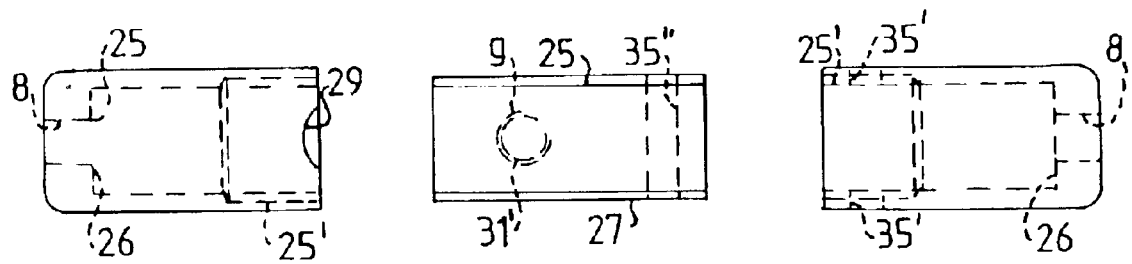
FIG. 2 shows a diagrammatic side view of a connecting element according to the first embodiment of the invention in a dismantled state.

FIG. 2 shows a diagrammatic side view of the main parts of a connecting element 1 according to the first embodiment. The first casing body 5 therefore comprises the through-hole 7, which is of stepped design with a first shoulder 26, against which the boss (shown in FIG. 1) can rest. The said shoulder 26 is advantageously beveled with a bevel 25 in order to provide support against the round shape of the boss 20 and so that the shoulder 26 does not cut into the boss 20. At the first end 11 of the casing body 6 there is a joining section 9. An inside thread 25' is here produced in the through-hole 7 in order to receive the thread 25 of the joint sleeve 27. A tapped hole 31' is produced in the joint sleeve 27 for receiving a lock bolt 31 (not shown in FIG. 2, see FIGS. 1, 6, 7 and 8). FIG. 2 also shows the bore 35' and the corresponding hole 35" for receiving the locking pin 35 (see FIG. 1).

Figure 3:
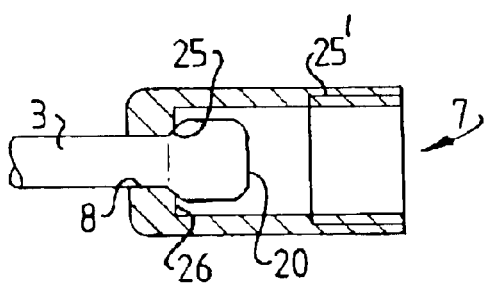
FIG. 3 shows a diagrammatic cross section of a part of the connecting element according to the first embodiment of the invention.

FIG. 3 shows a part of the connecting element 1 according to the first embodiment. FIG. 3 shows how the bracing wire 3 with its boss 20 is accommodated by the shoulder 26 with its bevel 25. In order to remove the casing body 6 from the bracing wire 3 the wire can be severed in the vicinity of the connecting element 1 and the wire end with the boss 20 can then be removed. When making a new joint a new wire end can now be introduced through the bore 8 and the hole 7 to be then upset with the aid of an upsetting machine.

Figure 4:
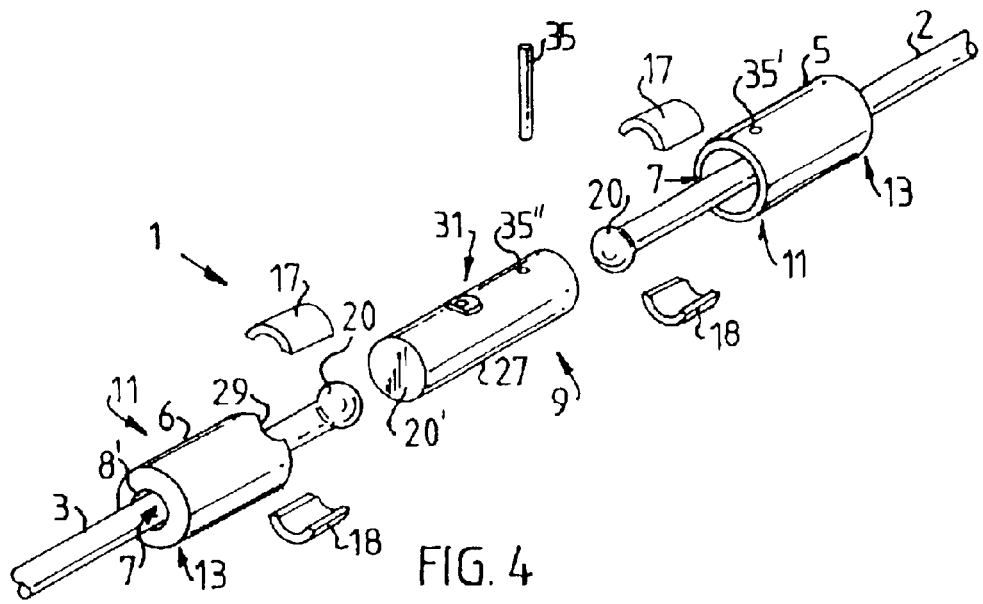
FIG. 4 shows a diagrammatic perspective view of a connecting element according to a second embodiment of the invention.
Figure 5:
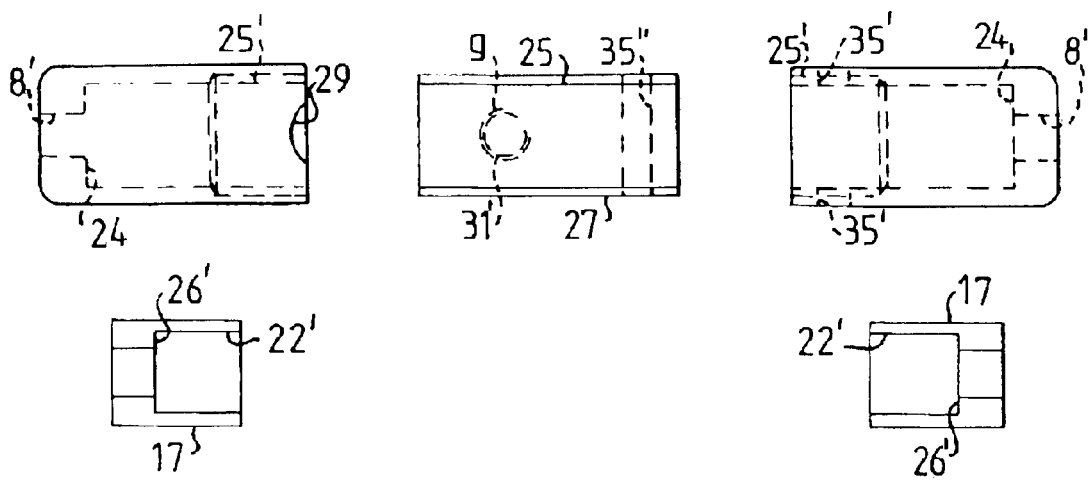
FIG. 5 shows a diagrammatic side view of a connecting element according to the second embodiment of the invention in a dismantled state.

FIGS. 4 and 5 show a second embodiment of the invention, in which the connecting element 1 is dismantled. The reference numbers shown in these figures largely correspond to those shown in FIG. 1. The difference compared to the first embodiment lies, among other things, in the fact that the bore 8' has a larger diameter than the boss 20. From this two projections 17 and 18 have been produced in order to form a support between the shoulder 26 of each casing body 5 and 6 and each boss 20 respectively. In a working position the said projections 17 and 18 together form a stop casing 22. The said stop casing 22 forms a second shoulder 26'(see FIG. 6), against which the boss 20 rests. In FIG. 4 the casing parts that constitute the projections 17 and 18 are formed without any shoulder on the inside. That is to say, in the working position the boss 20 rests against one end of the stop casing 22 formed. The second shoulder 26' may advantageously be formed inside the stop casing 22 (see FIG. 5). In this way, when coupling the bracing wire 3 to the connecting element 1, the boss 20 can be guided in with the aid of a substantially cylindrical flange area 22', formed all round the second shoulder 26', to the stop casing 22 and thus finish up correctly at the second shoulder 26'. This guide means that the boss 20 is largely centred in the casing body 6, without impinging on or being acted upon by the inner surface of the casing body 6. FIG. 5 shows a diagrammatic side view of the connecting element 1 in FIG. 4 and its main parts. Here one of the projections 17 has been clearly shown in order to illustrate the second shoulder 26', which constitutes a support for the boss 20.

A harder material may advantageously be used for the casing parts 17 and 18 than for the casing bodies 5 and 6. This harder material is often more expensive. By making the casing parts 17 and 18 replaceable, the material cost can be reduced. This is because in the event of any wear it is only necessary to replace the casing parts 17 and 18. There are advantageously two casing parts or projections, although there may be more. They are formed so that when detaching from the bracing wire 3 they allow the bracing wire 3 with its boss 20 to be taken out of the casing body 6 without having to remove the boss 20 or sever the wire. This is facilitated by the fact that the bore 8' has a larger diameter than the boss 20.

Figure 6:
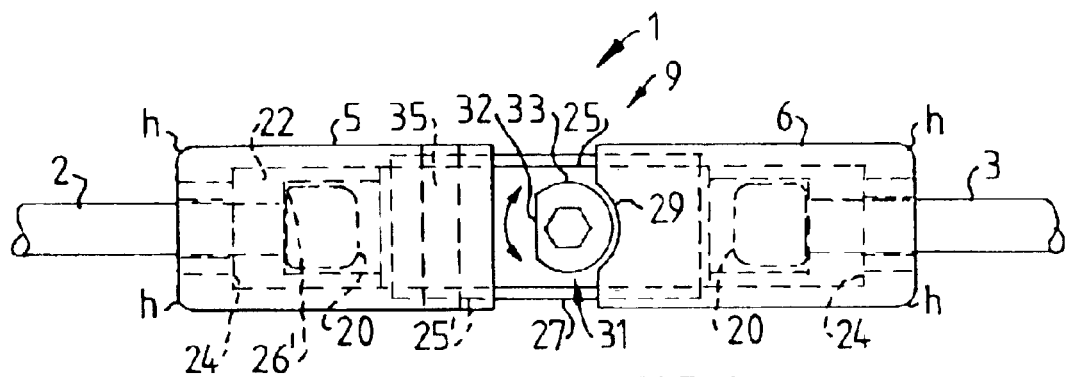
FIG. 6 shows a diagrammatic side view of the connecting element according to the second embodiment in a fitted state.
Figure 7:
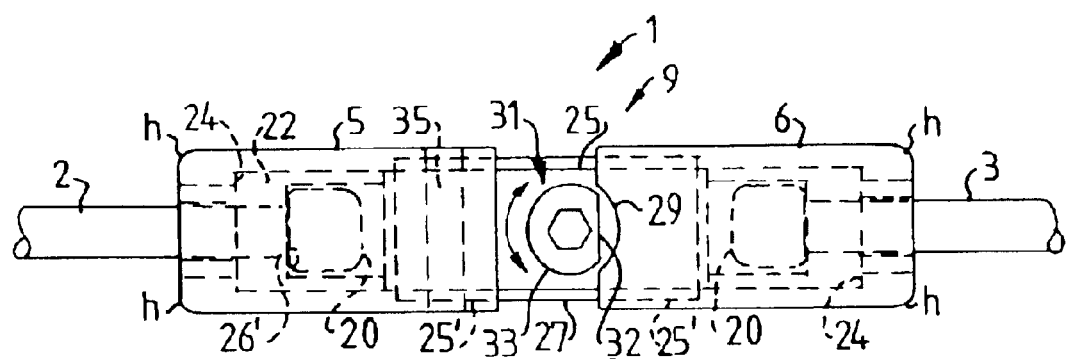
FIG. 7 shows a diagrammatic side view of the invention shown in FIG. 6 in an unassembled state.

FIG. 6 shows a diagram of a connecting element 1 according to the second embodiment fitted to a bracing wire 3 and a draw wire 2. The reference numbers occurring in FIGS. 6 and 7 correspond to the reference numbers described and shown earlier, but it must be noted that the connecting element is viewed from a different direction to that shown in FIGS. 3–5. FIG. 6 clearly shows how the bracing wire 3 and the draw wire 2 bear against respective projections 17 and 18 (only 17 is shown in FIGS. 6 and 7, because 18 is obscured). The projections 17 and 18 in turn bear against a shoulder 24.

In the working position the bosses 20 produced at each wire end bear, freely rotatable, against the casing body 5 and 6 by way of the projections 17 and 18, producing an axial locking of each wire end. The number of parts has thus been substantially reduced compared to the prior art, which gives greater operating reliability. Because the wire core or the connecting element is free to rotate, undesirable stresses in the wire are avoided. Stresses caused by known design constructions currently on the market have resulted in accidents when tensioning or drawing wires. The boss 20 is produced after or before the bracing wire 3 is passed. Through the bore 8' in the casing body 6. The bore 8' therefore has a larger diameter than the boss 20.

In this context two casing parts, for example, formed as projections, can ensure that fitting the casing body to and detaching it from the bracing wire 3 can be done without needing to sever the wire. Consequently the boss 20 does not need to be removed when dismantling, which reduces the working time when drawing a cable, which in itself may comprise up to 80 wires. Likewise the two casing parts 17 and 18, against which the boss 20 bears, mean on the one hand that the core of the wire can rotate due to the fact that the boss 20 has the facility to rotate in relation to the second shoulder 26' of the stop casing 22 formed from the projections 17 and 18, and on the other that the actual stop casing 22 can rotate in the casing body 6. This results in minimal wear of the device according to the invention, since the friction is distributed over numerous surfaces in the connecting element The connecting element 1 according to the invention comprises similar locking members both for the wire that is to be tensioned and the draw wire itself. This provides further scope for the wire to rotate and further reduces wear.

The casing body 6 is locked to the joint sleeve 27 by means of a lock bolt 31 having a beveled head 33. The bevel is preferably a plane 32. In the assembled position the plane 32 is turned away from the casing body 6 so that the non-beveled section of the head 33 is accommodated by the recess 29 for locking. In this way the casing body 6 can be locked to the joint sleeve 27, which prevents the casing body 6 being accidentally released from the joint sleeve 27 in an undesirable way. The head 33 is accommodated by the recess 29 in the casing body 6 to such an extent that no part of the projecting member protrudes beyond the outline of the casing body. This prevents wires or other objects catching in the connecting element. The connecting element also has rounded corners h, in order to allow smooth transport thereof from one position to another. Since the head 33 is easily accommodated by the recess 29 and the device can be easily and swiftly handled, much time can be saved. At the same time safety on the construction site is maintained since a double safeguard to prevent the device coming unscrewed has been created. The freely rotatable connecting element 1 means that the element rotates over each boss 20, thus eliminating torsional forces acting on the joining section 9, whilst the connection is secured by means of the said lock bolt 31.

To release the casing body 6 from the joint sleeve 27, the lock bolt 31 is turned approximately one half turn, so that the plane 32 is turned towards the casing body 6, as shown in FIG. 7. The arrow P shows the turning direction of the lock bolt 31 illustrated in FIGS. 6 and 7.

FIG. 7 shows the connecting element 1 according to the invention in a position in which the casing body 6 can be released from the joint sleeve 27. The casing body 6 can thereby be released from the joint sleeve 27 in a controlled way, which in turn means that the wire with the boss 20 can easily be removed from the casing body 6. Turning the lock bolt 31 can be done with the aid of a tool, such as a hexagon socket key.

Figure 8:
FIG. 8 shows a diagram of an example of a fixing unit in FIGS. 6 and 7.

FIG. 8 shows an example of the lock bolt 31 according to the invention. The plane 32 is advantageously produced so that its surface is tangent to the outer surface of the bolt body, that is to say the area for the thread G. The thread G corresponds to the thread g produced in the joint sleeve 27 (see FIGS. 2 and 5). The recess u for the hexagon socket key is produced in the head 33.

Figure 9:
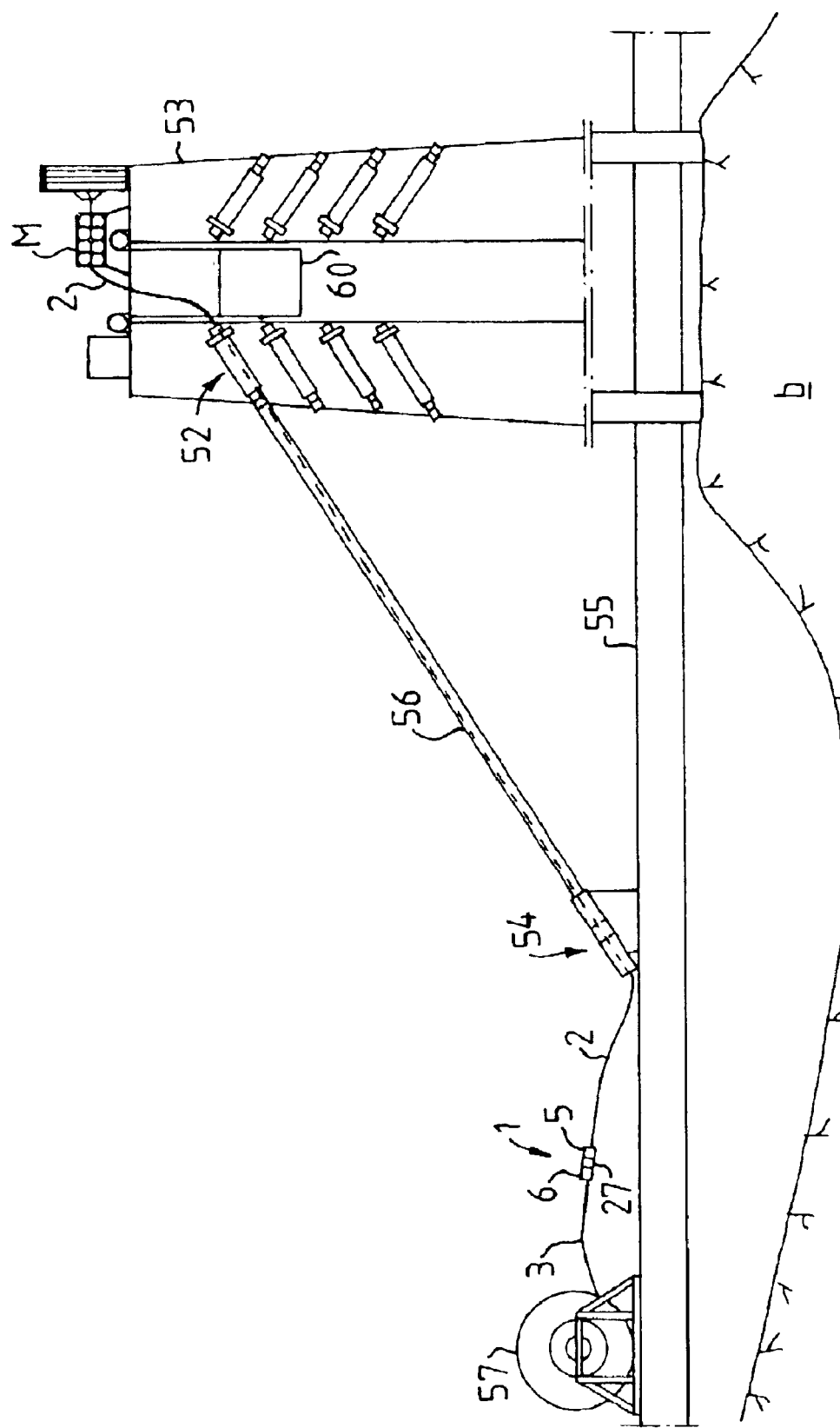
FIG. 9 shows a diagram of the connecting element used in the construction of a cable-stayed bridge.

FIG. 9 shows an example of the sphere of application, in which the connecting element 1 according to the invention is used to advantage. The terms "upper", etc. refer to the usual orientation on structures etc. such as upwards, downwards and so on. For the sake of clarity, in FIG. 9 the proportions do not correspond to the actual ones. In the drawing the main parts of a cable-stayed bridge under construction are shown diagrammatically. FIG. 9 may be explained below in conjunction with FIG. 5. By means of a push machine M a draw wire 2 with the connecting element 1 (enlarged for elucidation of the method) is displaced from a position on an upper foundation 52 on a pylon 53 to a lower foundation 54 on a bridge floor 55 in order to bring up a bracing wire 3. The pylon 53 stands on the bed rock b. A hoist 60 for transporting persons and material is arranged on the pylon 53. The draw wire 2 is pushed together with the connecting element 1 through a cable duct 56 to the lower foundation 54, where a wire reel 57 with bracing wire 3 is located. At the end of the bracing wire 3 a boss 20 (not shown in FIG. 9) is produced by means of an upsetting machine (not shown). According to the first embodiment the boss 20 is upset after the casing body 6 has been applied to the wire. According to the second embodiment the boss 20 can preferably be upset before the casing body 6 is applied to the wire.

The end of the bracing wire 3 is passed through the casing body 6. Casing parts (not shown in FIG. 9, but shown by reference numbers 17 and 18 in FIG. 4) are placed around the end of the bracing wire 3 and inside the casing body 6. The bracing wire 3 is drawn back so that the boss 20 bears against the projections 17 and 18 in the casing body 6. The intermediate part, for example a joint sleeve 27 provided with thread 25, is screwed into the casing body 6 so that the end 20'0 of the joint sleeve 27 presses the boss 20 fully in against the casing parts 17 and 18 and the casing body 6. In this way the boss 20 can be guided into a position against the shoulder when assembling, which means that the projections 17 and 18 interact before actual drawing of the bracing wire 3 takes place. At this stage the head 33 of the lock bolt 31 is turned with its plane 32 towards the casing body 6, so that the casing body 6 can be turned into a position in which the recess 29 aligns with the lock bolt 31 (see FIG. 7). In this position the lock bolt is preferably tightened by 180 degrees or at least so far that the plane 32 ends up in the area of the recess 29. This position is shown in FIG. 6. After this tightening the lock bolt 31 is tightened to its lowest position using the requisite force and locks the casing body 6 to the joint sleeve 27. The second casing body 5 is locked to the joint sleeve 27 by means of the locking pin 35.

The push machine M, which may also preferably be equipped with drawing drive members, then draws the bracing wire 3 back by means of the draw wire 2 and the connecting element 1 through the cable duct 56 to the area of the upper foundation 52. The bracing wire 3 is then fixed to the lower foundation in the conventional way and cut off below this. The bracing wire 51 now situated in the cable duct 56 is then drawn with the requisite force and fixed to the upper foundation 52.

The lock bolt 31 is then slackened to a position as shown in FIG. 7. That is to say the lock bolt 31 is turned through approximately 180 degrees to a position in which the plane 32 of the head 33 lies opposite the casing body 5 largely perpendicular to the longitudinal direction of the casing body. The casing body 6 can then be screwed off the joint sleeve 27. The end of the bracing wire 3 is also pushed back so that the boss 20 is exposed together with the casing parts 17 and 18 (shown in FIG. 3), these then being removed, which means that the bracing wire 3 with its boss 20 can be brought out of the casing body 6. Parts of the connecting element 1 can be re-assembled (the connecting element is still fitted to the draw wire 51) and again pushed down by means of the draw wire 2 to the lower foundation 54 to be again coupled to a new end of the bracing wire 3.

The bracing wire 3 can naturally be fixed to the upper foundation 52 first and then tensioned from the bridge floor 55 below at the lower foundation 54 and then fixed there. The connecting element 1 together with the draw wire 3 can be passed to the lower foundation 54 whilst actual fixing of the bracing wire is in progress.

This downward and upward displacement of the draw wire with the connecting element described above can be performed eighty times in a cable duct 56, since a cable duct may generally contain up to this number of bracing wires. A cable-stayed bridge may in turn have up to a hundred cable ducts. By means of the invention much time can therefore be saved when assembling the said bracing wires. In addition the invention is extremely reliable in operation and is not complicated to handle.

What is claimed is:

1. A connecting element for joining two support members absorbing tensile forces, said connecting element comprising:

at least a first and a second casing body with a through-hole in each said casing body for receiving the respective support members, which casing bodies can be joined together by way of a joining section at a first end of each casing body, an opposing second end of each casing body being provided with a locking member for holding the support members fast, wherein in a working position the locking member of at least one casing body produces an axial locking of the support member running through the casing body by way of a stop part created on the support member with the area of the second end of the casing body, wherein the stop part is an upset part produced on the support member and having a diameter larger than a diameter of the support member;

wherein the through-hole is of stepped design with a first shoulder having a bevel, against which the stop part rests;

wherein the joining section of each casing body comprises means for joining the casing body to an intermediate part, and wherein in a working position a recess in one of the casing bodies viewed in the longitudinal direction of the casing body and the intermediate part, aligns with a fixing unit and encloses the casing body, the fixing unit being arranged so that it can be fixed to the intermediate part, and a projecting member of the fixing unit being accommodated by the recess, so that the casing body cam be torsionally locked to the intermediate part.

2. The connecting element of claim 1, wherein the locking member comprises at least two casing parts which in the working position form a stop casing, which forms a second shoulder, against which the stop part rests.

3. The connecting element according to claim 2, wherein the second shoulder is formed inside the stop casing.

4. The connecting element according to claim 3, wherein the projecting member of the fixing unit can be released so that it is not accommodated by said reccess, thereby allowing the casing body to be released from the intermediate part.

5. The connecting element of claim 4, wherein the joining section of the other casing body is torsionally locked by means of a locking pin, which can be inserted through a hole through said other casing body and the intermediate part.

6. The connecting element according to claim 1, wherein the projecting member of the fixing unit can be released so that it is not accommodated by said recess, thereby allowing the casing body to be released from the intermediate part.

7. The connecting element of claim 6, wherein the joining section of the other casing body is torsionally locked by means of a locking pin, which can be inserted through a hole through said other casing body and the intermediate part.

8. The connecting element of claim 1, wherein the joining section of one of the casing bodies is torsionally locked by means of a locking pin, which can be inserted through a hole through said other casing body and the intermediate part.

9. A method for fitting a support member to a building construction by means or a connecting element, said method comprising the following steps:

passing a draw wire through a cable duct together with the connecting element, which comprises a first and a second casing body with a through-hole in each casing body for receiving respective support members, and which casing bodies can be joined together via a joining section at a first and of each casing body, an opposing second end of each casing body being provided with a locking member for holding the support members fast so that the connecting element finishes up in an area of a first foundation;

connecting a bracing wire to the connecting element coupled to the draw wire;

passing the bracing wire through the cable duct in the opposite direction by means of the draw wire and the coupled connecting element, so that the connecting element finishes up in an area of a second foundation;

fastening the bracing wire to the first or second foundation;

detaching the connecting element from the bracing wire;

applying each said casing body over a stop part produced on the respective support member;

fitting at least two casing parts around each support member;

drawing each support member so that the part bears the casing parts, which casing parts in a working position rest against an internal shoulder in the through-hole whilst the stop part rest against the casing parts in order to produce an axial locking of the draw wire and the bracing wire; and joining at least one said casing body to an intermediate part.

10. The method of claim 9, further comprising the step of:

locking torsionally one of said casing bodies to the intermediate part by means of a fixing unit arranged on the intermediate part, which fixing unit has a projecting member, which during coupling together the casing body and the intermediate part is released until a recess in the casing body, viewed in longitudinal direction of the casing body and the intermediate part, aligns with the fixing unit and encloses the casing body, at which time the fixing unit with its projecting member is brought into engagement with the recess.

11. The method of claim 6, further comprising the step of:

locking torsionally the other said casing body to the intermediate part by means of a locking pin.

* * * * *

UNITED STATES PATENT AND TRADEMARK OFFICE
CERTIFICATE OF CORRECTION

PATENT NO. : 6,814,523 B1
DATED : November 9, 2004
INVENTOR(S) : Ivar Nilsson

It is certified that error appears in the above-identified patent and that said Letters Patent is hereby corrected as shown below:

Column 8,
Line 30, delete "cam" and replace with -- can --.
Line 37, delete "3" and replace with -- 1 --.
Line 46, delete "1" and replace with -- 3 --.

Column 10,
Line 17, delete "6" and replace with -- 10 --.

Signed and Sealed this

Tenth Day of May, 2005

JON W. DUDAS
*Director of the United States Patent and Trademark Office*